United States Patent
Hasegawa et al.

(10) Patent No.: US 7,423,415 B2
(45) Date of Patent: Sep. 9, 2008

(54) DC-DC CONVERTER AND ITS CONTROL METHOD, AND SWITCHING REGULATOR AND ITS CONTROL METHOD

(75) Inventors: Morihito Hasegawa, Kasugai (JP); Hidekiyo Ozawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 11/350,720

(22) Filed: Feb. 10, 2006

(65) Prior Publication Data

US 2007/0052398 A1 Mar. 8, 2007

(30) Foreign Application Priority Data

Sep. 5, 2005 (JP) .............................. 2005-256419

(51) Int. Cl.
*G05F 1/00* (2006.01)
(52) U.S. Cl. .................. 323/282; 323/222; 323/284
(58) Field of Classification Search .............. 323/222, 323/281, 282, 284
See application file for complete search history.

(56) References Cited

U.S. PATENT DOCUMENTS

| | | | | |
|---|---|---|---|---|
| 5,847,554 | A * | 12/1998 | Wilcox et al. | 323/282 |
| 6,150,803 | A * | 11/2000 | Varga | 323/282 |
| 6,163,142 | A * | 12/2000 | Tsujimoto | 323/283 |
| 6,424,129 | B1 * | 7/2002 | Lethellier | 323/272 |
| 6,465,993 | B1 * | 10/2002 | Clarkin et al. | 323/272 |
| 6,642,696 | B2 * | 11/2003 | Tateishi | 323/222 |
| 6,674,274 | B2 * | 1/2004 | Hobrecht et al. | 323/285 |
| 6,979,984 | B2 * | 12/2005 | Perrier et al. | 323/281 |
| 7,071,662 | B2 * | 7/2006 | Hsu et al. | 323/272 |
| 7,107,468 | B2 * | 9/2006 | Pullen et al. | 713/300 |
| 2005/0052166 | A1 * | 3/2005 | Hsu et al. | 323/271 |

FOREIGN PATENT DOCUMENTS

JP 2002-111470 A 4/2002

* cited by examiner

*Primary Examiner*—Jessica Han
*Assistant Examiner*—Emily Pham
(74) *Attorney, Agent, or Firm*—Arent Fox LLP

(57) ABSTRACT

A differential output DC-DC converter capable of decreasing power consumption is presented. The differential output DC-DC converter 1 comprises output terminals VP and VM connected to both ends of load, and a switching regulator 10 for passing a source current. It further comprises a third transistor FET3, a choke coil L2, and a fourth transistor FET4 for rectifying a sink current in a flowing direction, and further a second regulator for allowing the sink current to flow, and issuing a voltage higher than a grounding point GND voltage and lower than a voltage of an output terminal VP, to an output terminal VM.

11 Claims, 5 Drawing Sheets

CIRCUIT DIAGRAM OF DIFFERENTIAL OUTPUT DC-DC CONVERTER IN EMBODIMENT 1

FIG. 1 CIRCUIT DIAGRAM OF DIFFERENTIAL OUTPUT DC-DC CONVERTER IN EMBODIMENT 1

OPERATION WAVEFORM DIAGRAM OF DIFFERENTIAL OUTPUT DC-DC CONVERTER IN EMBODIMENT 1

FIG. 3 CIRCUIT DIAGRAM OF DIFFERENTIAL OUTPUT DC-DC CONVERTER IN EMBODIMENT 2

FIG. 4 CIRCUIT DIAGRAM OF DIFFERENTIAL OUTPUT DC-DC CONVERTER IN EMBODIMENT 3

CIRCUIT DIAGRAM OF PRIOR ART

DC-DC CONVERTER AND ITS CONTROL METHOD, AND SWITCHING REGULATOR AND ITS CONTROL METHOD

CROSS-REFERENCE TO RELATED APPLICATIONS

This application is based upon and claims the benefit of priority from each of the prior Japanese Patent Application No. 2005-256419 filed on Sep. 5, 2005, the entire contents of which are incorporated herein by reference.

BACKGROUND OF THE INVENTION

1. Field of the Invention

The present invention relates to a DC-DC converter for issuing a differential voltage, and a switching regulator for passing sink current.

2. Description of the Related Art

Along with diversification of an operating voltage in electronic devices, there is an increasing demand for a DC-DC converter for generating different supply voltages. Recently, for application into interface technology between electronic devices of different supply voltages, not only at the high voltage side of supply voltage but also at the low voltage side, the DC-DC converter issuing differential voltage by setting variably is being demanded.

One of such interface technologies is disclosed, for example, in Japanese unexamined patent publication No. 2002-111470. This technology applies to the semiconductor chip including a plurality of circuit blocks mutually different in an operating supply voltage, and substantially common in a logical threshold voltage. Individual circuit blocks are characterized by using the voltage difference of a low voltage level and a high voltage level as an operating supply voltage, with the logical threshold voltage enclosed between them, and are capable of issuing a signal in an amplitude corresponding to the operating supply voltage, and receiving a signal of other amplitude having the logical threshold voltage enclosed between them.

Japanese unexamined patent publication No. 2002-111470 discloses a voltage generating circuit shown in FIG. 5 for realizing such interface technology. The voltage generating circuit comprises a pair of regulators 111 and 112. The regulator 111 is a source side linear regulator for generating a high voltage level vdd1 on the basis of reference voltage (+) vref1. On the other hand, the regulator 112 is a sink side linear regulator for generating a low voltage level vss1 on the basis of a reference voltage (−) vref1. Accordingly, a high voltage level vdd1 and a low voltage level vss1 enclosed by the high voltage level vcc and the low voltage level gnd of the operating supply voltage in a semiconductor chip can be supplied as power source to a circuit block BLK1.

SUMMARY OF THE INVENTION

However, in the voltage generating circuit in Japanese unexamined patent publication No. 2002-111470, since linear regulators are used in both regulators 111 and 112, excessive power is spent in conversion of a voltage in both regulators. For example, in the linear regulator 111, an n-channel MOS transistor M4 is connected in series to an n-channel MOS transistor M3 of a source follower type, and a voltage of a coupling node N1 is fed back to the n-channel MOS transistor M3 by way of a comparator AMP. The n-channel MOS transistor M3 is bias controlled so that the voltage of the coupling node N1 may be equal to the reference voltage (+) vref1 supplied to the comparator AMP. At this time, in the n-channel MOS transistor M3, since a voltage difference of (the high voltage level vcc−the high voltage level vdd1) occurs, electric power is consumed. In the regulator 112, too, electric power is consumed similarly in a p-channel type MOS transistor M6. Such electric power by conversion of a voltage is a problem because it causes increase of power consumption and heat generation in the entire system.

The invention is devised in the light of the above problems of the prior art, and it is hence an object thereof to present a DC-DC converter and its control method, and a switching regulator and its control method capable of reducing power consumption.

To solve the above problem, there is provided a DC-DC converter of a first aspect of the invention comprising: a first terminal and a second terminal connected to both ends of a load, a first regulator for passing a current in a direction from the first terminal toward the load, and issuing a first voltage to the first terminal, a second regulator for passing a current in a direction from the load toward the second terminal, and issuing a second voltage, being higher than a base voltage and lower than the first voltage, to the second terminal, wherein the second regulator is a switching regulator, including a main inductor and a main switch provided sequentially in a pathway from the second terminal to the base voltage, and a rectifying circuit provided in a direction of passing the current from the connection point of the main inductor and the main switch, toward the first terminal or a power supply terminal.

To solve the above problem, there is also provided a switching regulator of the first aspect of the invention comprising: a main inductor and a main switch provided sequentially in a pathway from a low voltage side terminal of a load to a base voltage, and a rectifying circuit provided in a direction of a passing current from a connection point of the main inductor and the main switch toward a high voltage side terminal of the load, wherein the current is passed from the load to the lead-in direction, and an output voltage higher than the base voltage and lower than the voltage supplied to the load is issued to the low voltage side terminal of the load.

In the DC-DC converter and the switching regulator of the invention, when the main switch does not conduct, the main conductor operates to pass the current in the same direction continuously. Consequently, the main inductor passes the current into a first terminal or a power supply terminal by way of a rectifying circuit. As a result, the excess energy left over in the main inductor is regenerated toward the first terminal or the power supply terminal by way of the rectifying circuit. Hence the spent power may be decreased as compared with the case of using the linear regulator in the sink side regulator, or using the switching regulator not performing regenerative operation.

To solve the above problem, there is provided a control method of a DC-DC converter of a second aspect of the invention, including a first terminal and a second terminal connected to both ends of a load, a first regulator of a switching regulator of step-down type for passing a current in a direction from the first terminal toward the load, and issuing a first voltage to the first terminal, a second regulator of the switching regulator of step-down type for passing a current in a direction from the load toward the second terminal, and issuing a second voltage, being higher than a base voltage and lower than the first voltage, to the second terminal, comprising: a step of generating a synchronous signal, a step of starting increase of a current in a direction from the first terminal to the load depending on the synchronous signal, and a step of starting increase of a current in a direction from the load to the second terminal depending on the synchronous signal.

In a DC-DC converter comprising a first regulator as a step-down switching regulator connecting a first terminal and a second terminal at both ends of a load and passing a current (source current) in a direction from the first terminal toward the load, and a second regulator as the step-down switching regulator for passing a current (sink current) in a direction from the load to the second terminal, when the current difference of the source current and the sink current becomes larger, a ripple current caused by this current difference increases. The ripple current is larger when the period of changing by different time inclinations is longer in the source current and the sink current. For example, when the DC-DC converter is controlled at the timing of matching between a maximum value of the source current and a minimum value of the sink current, the peak value of the ripple current becomes maximum. When the ripple current increases, generated noise increases, and the power loss for charging and discharging of the capacitor provided at the output terminal is increased.

The control method of the DC-DC converter of the invention executes a step of starting increase of a current from the first terminal to the load (source current) and a step of starting increase of a current from the load to the second terminal (sink current), depending on a synchronous signal. As a result, the start periods of the source current and the sink current are matched, and incidence of the maximum value of the source current and the minimum value of the since current can be prevented securely. In the source current and the sink current, the period of changing in a positive time inclination becomes the longest, and the period of changing at different time inclinations can be set shortest, and hence the ripple current can be minimized. Hence, generated noise is suppressed, and the power loss due to charging and discharging of the capacitor can be decreased.

To solve the above problem, there is provided a control method of a DC-DC converter of a third aspect of the invention, including a first terminal and a second terminal connected to both ends of a load, a first regulator for passing a current in a direction from the first terminal toward the load, and issuing a first voltage to the first terminal, a second regulator of a switching regulator of step-down type for passing a current in a direction from the load toward the second terminal, and issuing a second voltage, being higher than a base voltage and lower than the first voltage, to the second terminal, comprising: a step of issuing a divided voltage divided between the first voltage and the second voltage, a step of generating a threshold voltage by subtracting a specified voltage from the first voltage, and a step of generating an error signal by subtracting the threshold voltage from the divided voltage and amplifying.

In the control method of the DC-DC converter and the switching regulator of the invention, if the first voltage is nearly zero right after turning on the power source, an error signal having normal polarity can be generated. Hence, inversion of polarity of the error signal can be prevented.

DETAILED DESCRIPTION OF THE PREFERRED EMBODIMENTS

Exemplary embodiments of a DC-DC converter and a switching regulator of the invention are specifically described below while referring to FIG. 1 to FIG. 4.

Embodiment 1

Figure 1:
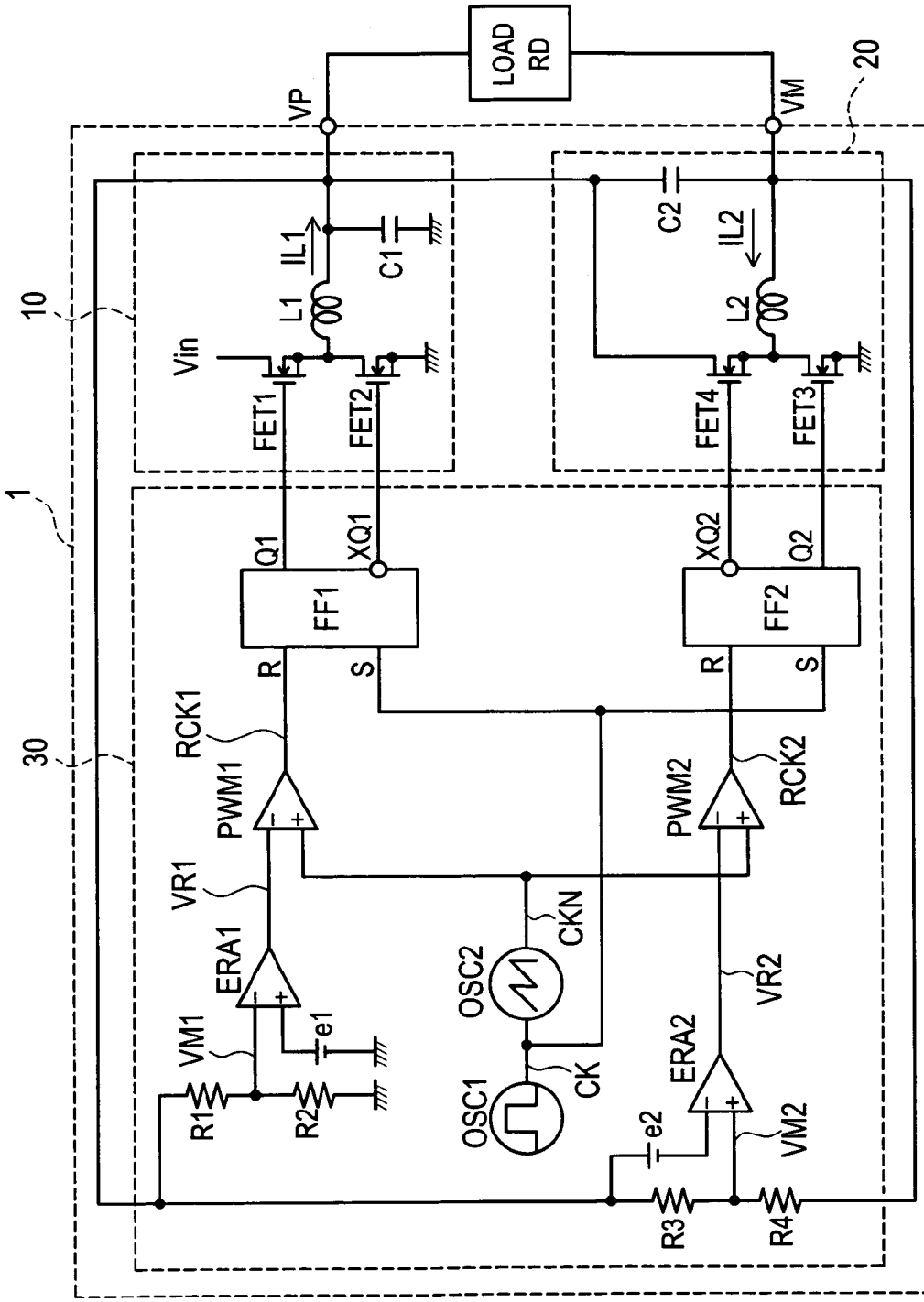
FIG. 1 is a circuit diagram of a differential output DC-DC converter in an embodiment 1 of the invention.

FIG. 1 is a circuit diagram of a differential output DC-DC converter 1 in an embodiment 1 of the invention.

The differential output DC-DC converter 1 is a DC-DC converter for converting an input voltage V0 applied to a power supply terminal Vin into two sets of different output voltages V1 and V2, and issuing to output terminals VP and VM. The differential output DC-DC converter 1 comprises a first switching regulator 10 of a current source type, a second switching regulator 20 of a current sink type, and a control unit 30 for controlling the first switching regulator 10 and the second switching regulator 20.

The first switching regulator 10 includes a first transistor FET1 as a main switch, a second transistor FET2 as a synchronous rectifying circuit, a choke coil L1 as a main inductor, and a capacitor C1 as a smoothing capacitor. In the first transistor FET1 and the second transistor FET2, their source electrodes are connected to an input end of the choke coil L1 and a grounding point GND, respectively, and the drain electrodes are connected to a power supply terminal Vin and the input ends of the choke coil L1, respectively, and gate electrodes are connected to control outputs of the control unit 30. The output end of the choke coil L1 is connected to the output terminal VP together with the capacitor C1 being grounded at the other end.

The second switching regulator 20 includes a third transistor FET3 as the main switch, a fourth transistor FET4 as the synchronous rectifying circuit, a choke coil L2 as the main inductor, and a capacitor C2 as the smoothing capacitor. In the third transistor FET3 and the fourth transistor FET4, their source electrodes are connected to a grounding point GND and an input end of the choke coil L2, respectively, and the drain electrodes are connected to an input end of the choke coil L2 and an output of the first switching regulator 10 for generating an output voltage V1, respectively. The gate electrodes are connected to control outputs from the control unit 30. The output end of the choke coil L2 is connected to the output terminal VM together with the capacitor C2 being grounded at the other end.

The control unit 30 includes flip-flops FF1 and FF2, operational amplifiers PWM1, PWM2, ERA1, and ERA2, resistance elements R1 to R4, a pulse oscillator OSC1 and a sawtooth oscillator OSC2. A clock signal CK issued from the pulse oscillator OSC1 is supplied to the sawtooth oscillator OSC2, a set input S of the flip-flop FF1, and the set input S of the flip-flop FF2. The sawtooth oscillator OSC2 generates a sawtooth signal CKN in synchronism with this clock signal CK, issues to the operational amplifier PWM1 and the operational amplifier PWM2. Specifically, at the leading edge of the clock signal CK, the sawtooth signal CKN is reset to 0 V, and the level is raised to the rise of next period by time inclination.

Of the control unit 30, the section for controlling the first transistor FET1 and the second transistor FET2 is explained.

The resistance elements R1 and R2 are connected in series between the output terminal VP and the grounding point GND, and its middle voltage VM1 is taken out. In an error amplifier ERA1 as an error amplifier of the first switching regulator 10, the middle voltage VM1 is supplied to an inversion input, and a base voltage e2 from the grounding point GND is supplied to a non-inversion input. Therefore, the error amplifier ERA1 subtracts the middle voltage VM1 from a base voltage e1, and amplifies the differential voltage, and issues to the operational amplifier PWM1.

In the operational amplifier PWM1, the sawtooth signal CKN is supplied to the non-inversion input, and a reference voltage VR1 as an output of the error amplifier ERA1 is supplied to the inversion input. Therefore, in one period of the sawtooth signal CKN, in the linearly elevating period of a voltage value, when the level exceeds the voltage value of the reference voltage VR1, the output level of the operational amplifier PWM1 changes from a low level to a high level. When the sawtooth signal CKN is changed to the low level, the output of the operational amplifier PWM1 changes also from the high level to the low level. As a result, when the voltage value of the reference voltage VR1 varies, the transition timing of a reset signal RCK1 of the operational amplifier PWM1 changing from the low level to the high level also varies. That is, the operational amplifier PWM1 issues the reset signal RCK1 of which pulse width is modulated depending on the voltage value of the reference voltage VR1.

In the flip-flop FF1, the clock signal CK is supplied to the set input S, and the reset signal RCK1 is supplied to the reset input R. Therefore, the output Q1 is set at the high level upon a rise of the clock signal CK, the output Q1 is set at the low level upon a rise of the reset signal RCK1. The flip-flop FF1 issues the output Q1 to the gate electrode of the first transistor FET1, and issues the inversion output XQ1 to the gate electrode of the second transistor FET2. Accordingly, depending on the state of the flip-flop FF1, conduction control of the first transistor FET1 and the second transistor FET2 is executed exclusively.

Of the control unit 30, the section for controlling the third transistor FET3 and the fourth transistor FET4 is explained.

The resistance elements R3 and R4 are connected in series between the output terminal VP and the output terminal VM, and its middle voltage VM2 is taken out. In an error amplifier ERA2 as an error amplifier of the second switching regulator 20, the middle voltage VM2 is supplied to the non-inversion input, and a balance of a voltage at the output terminal VP by subtracting the base voltage e2 is supplied to the inversion input. Therefore, the error amplifier ERA2 amplifies the voltage value obtained in the middle voltage VM2—(a voltage of the output terminal–the base voltage e2), and issues to the operational amplifier PWM2.

In the operational amplifier PWM2, the sawtooth signal CKN is supplied to the non-inversion input, and the reference voltage VR2 as an output of the error amplifier ERA2 is supplied to the inversion input. Therefore, in one period of the sawtooth signal CKN, in the linearly elevating period of the voltage value, when the level exceeds the voltage value of the reference voltage VR2, the output level of the operational amplifier PWM2 changes from the low level to the high level. When the sawtooth signal CKN is changed to the low level, the output of the operational amplifier PWM2 changes also from the high level to the low level. As a result, when the voltage value of the reference voltage VR2 varies, the transition timing of the reset signal RCK2 of the operational amplifier PWM2 changing from the low level to the high level also varies. That is, the operational amplifier PWM2 issues a reset signal RCK2 of which pulse width is modulated depending on the voltage value of reference voltage VR2.

The error amplifier ERA2 may be also considered to be composed differently, that is, the middle voltage VM2 is supplied to the non-inversion input, and a base voltage e2a from the grounding point GND is supplied to the inversion input (herein the base voltage e2=a voltage of the output terminal VP in ordinary state–the base voltage e2). Therefore, right after supply of power source, when the voltage of the output terminal VP becomes about 0 V, the voltage of the base voltage e2a becomes the high level, and the error amplifier ERA2 issues a voltage of a negative polarity. That is, it should be a voltage of a positive polarity initially, but a voltage of an inverted polarity is issued. Accordingly, the reset signal RCK2 always remains at the high level until the voltage of the output terminal VP becomes a voltage in an ordinary state, and the third transistor FET3 is set in a conductive state. AS a result, a current flows in a reverse direction of the current IL2 in a pathway from the output terminal VP to the output terminal VM. Since the energy of the reverse polarity of the ordinate state is accumulated in the current IL2, and it takes a longer time until energy of the same polarity as in the ordinate state is accumulated in the process of transition to the ordinary state.

By contrast, in the differential output DC-DC converter 1 of the embodiment 1, if the voltage of the output terminal VP is low voltage right after supply of power source, the voltage by subtracting the base voltage e2 from the voltage of the output terminal VP is a voltage of the negative polarity, and hence the reference voltage VR2 issued by the error amplifier ER2 is a voltage of the positive polarity. Hence, if the output of the output terminal VP does not become a voltage in the ordinary state, the reset signal RCK2 is issued normally, and delay of time until operation of the second switching regulator 20 is stabilized can be suppressed.

In the flip-flop FF2, the clock signal CK is supplied to the set input S, and the reset signal RCK2 is supplied to the reset input R. Therefore, the output Q2 is set at the high level upon a rise of the clock signal CK, the output Q2 is set at the low level upon a rise of the reset signal RCK2. The flip-flop FF2 issues the output Q2 to the gate electrode of the third transistor FET3, and issues the inversion output XQ2 to the gate electrode of the fourth transistor FET4. Accordingly, depending on the state of the flip-flop FF2, conduction control of the third transistor FET3 and the fourth 30 transistor FET4 is executed exclusively.

Figure 2:
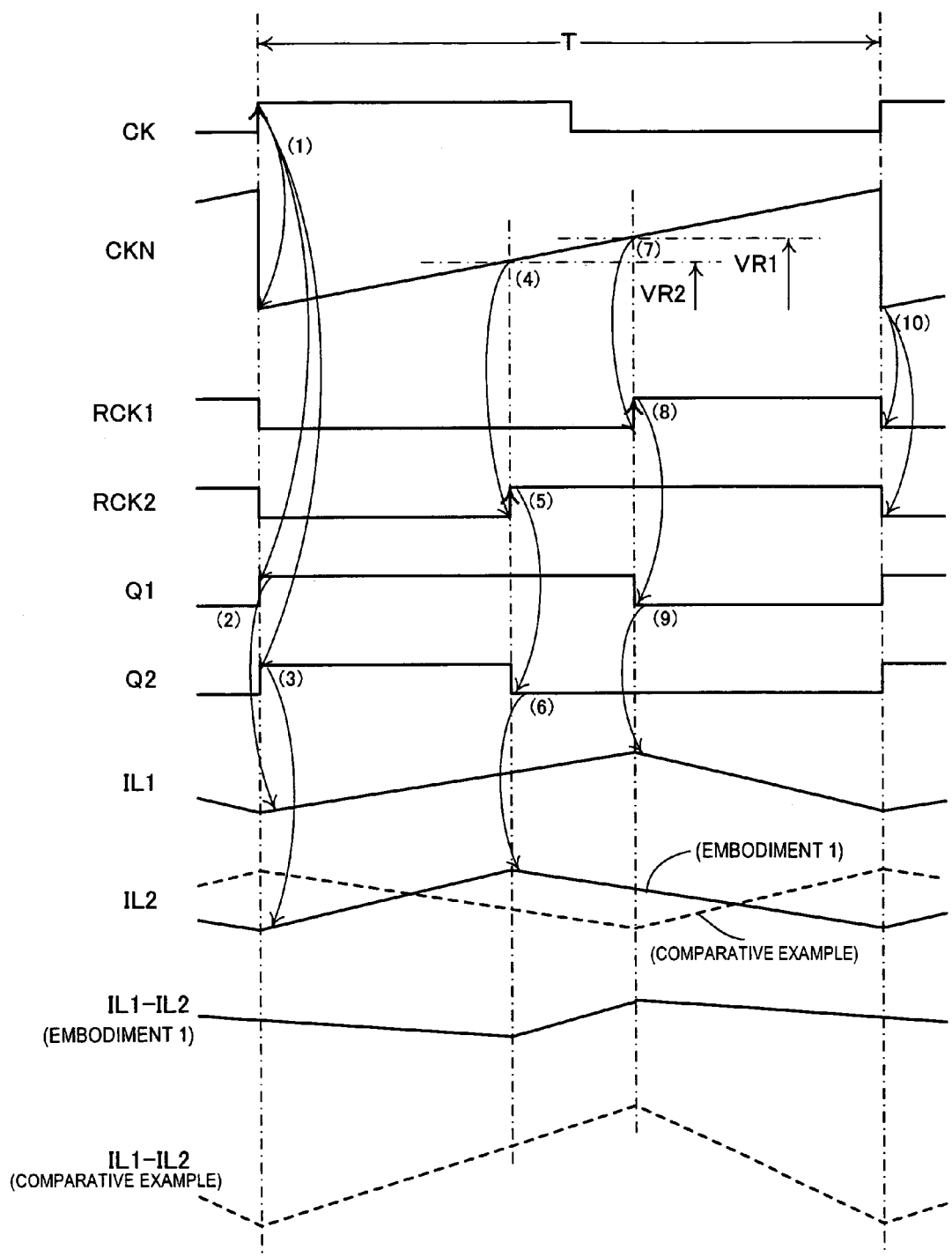
FIG. 2 is an operation waveform diagram of the differential output DC-DC converter in the embodiment 1 of the invention.

Operation of the differential output DC-DC converter 1 of the embodiment is described. FIG. 2 is an operation waveform diagram of the differential output DC-DC converter 1. The clock signal CK is an output waveform of the pulse oscillator OSC1, and is a rectangular wave oscillated in period T.

First at (1), the clock signal CK issued by the pulse oscillator OSC1 is changed to the high level, and the sawtooth signal CKN issued by the sawtooth oscillator OSC2 begins to elevate. At the same time, upon a rise of the clock signal CK, outputs Q1 and Q2 of flip-flops FF1 and FF2 are changed to the high level, and inversion outputs XQ1 and XQ2 are changed to the low level.

At (2), the gate level of the first transistor FET1 is changed to the high level, and the gate level of the second transistor FET2 to the low level, and hence the first transistor FET1 conducts and the second transistor FET2 does not conduct. At (3), the gate level of the third transistor FET3 is changed to the high level, and the gate level of the fourth transistor FET4 to the low level, and hence the third transistor FET3 conducts and the fourth transistor FET4 does not conduct. As a result, a pathway is formed from the power supply terminal Vin to the grounding point GND by way of the first transistor FET1, the choke coil L1, the load RD, the choke coil L2 and the third transistor FET3. At this time, in the choke coil L1, the current IL1 begins to increase in a direction from the connection side to the first transistor FET1 toward the connection side to the output terminal VP, and in the choke coil L2, too, the current IL2 begins to increase in a direction from the connection side to the load RD toward the connection side to the third transistor FET3.

At (4), when the voltage level of the sawtooth signal CKN exceeds the reference voltage VR2, the reset signal RCK2 is changed to the high level. At (5), upon a rise of the reset signal RCK2, the output Q2 of the flip-flop FF2 is changed to the high level, and the inversion output XQ2 to the low level. At (6), since the gate level of the third transistor FET3 changes to the low level, the third transistor FET3 does not conduct. At the same time, the gate level of the fourth transistor FET4 is changed to the high level, and the fourth transistor FET4 conducts. Hence, a pathway from the choke coil L2 to the output terminal VP by way of the fourth transistor FET4 is formed.

At this time, the choke coil L2 attempts to pass the current of the same direction as the current IL2 successively. The choke coil L2 passes the current IL2 into the output terminal VP through the fourth transistor FET4. As a result, the energy accumulated in the choke coil L2 is released through this pathway, and is regenerated at the output terminal VP side. Hence, consumption of electric power is decreased as compared with the case of using the linear regulator or in the case of using the switching regulator not performing regenerative operation at the sink side regulator. Along with release of energy, the current value of the current IL2 decreases gradually.

In this case, the first switching regulator 10 is no particularly specified as far as the sink current flows into the load RD and a voltage higher than a voltage of the output terminal VM can be issued to the output terminal VP. Specific examples are the linear regulator and the switching regulator. In the case of the switching regulator, it may be either a step-down type or a boost type.

At (7), when the voltage level of the sawtooth signal CKN exceeds the reference voltage VR1, the reset signal RCK1 is changed to the high level. At (8), upon a rise of the reset signal RCK1, the output Q1 of the flip-flop FF1 is changed to the high level, and the inversion output XQ1 to the low level. At (9), since the gate level of the first transistor FET1 is changed to the low level, the first transistor FET1 does not conduct. At the same time, the gate level of the second transistor FET2 is changed to the high level, and the first transistor FET1 conducts. As a result, a pathway is formed from the choke coil L1 to the output terminal VP by way of second transistor FET2. At this time, the choke coil L1 releases the accumulated energy, and continues to pass current in the same direction as current IL1. Along with drop of energy, the current of the current IL1 declines gradually.

At (10), when the sawtooth signal CKN is change to the low level, the reset signal RCK1 and the reset signal RCK2 are changed to the low level, and operation of one period is completed.

FIG. 2 also shows a graph of a comparative example in the broken line portion of the graph of the current IL2 and the graph showing the current value subtracting the current IL2 from the current IL1. The comparative example includes a step-down type source side switching regulator and a sink side switching regulator like the differential output DC-DC converter 1. However, this differential output DC-DC converter is different from the differential output DC-DC converter 1 in that each switching regulator is controlled in conduction asynchronously. FIG. 2 shows an operation waveform of the current IL1 increasing timing and the current IL2 decreasing timing.

As shown in FIG. 2, since the increasing timing of current IL1 and the current IL2 is different, when the current IL2 is subtracted from the current IL1, a change amount of the current value is the maximum. The current value of subtracting the current IL2 from the current IL1 is reflected in the ripple current as cause of noise generation between output terminals VP and VM, and this change in the current value causes to increase the current amount of charging and discharging of the capacitor C2 connected between output terminals VP and VM. It is hence preferred to minimize the change amount of the current value subtracting the current IL2 from the current IL1.

In the differential output DC-DC converter 1 of the embodiment 1, the first transistor FET1 of the first switching regulator 10 and the third transistor FET3 of the second switching regulator 20 are controlled in conduction by the flip-flop FF1 and the flip-flop FF2, respectively. In the flip-flop FF1 and the flip-flop FF2, clock signals CK are entered in each set terminal. That is, in the flip-flop FF1 and the flip-flop FF2, at the rise timing of the clock signal CK, outputs Q1 and Q2 are changed to the high level, and conduction of the first transistor FET1 and the third transistor FET3 is started at the same timing ((2) and (3)). As a result, in the current IL1 and the current IL2, the period of changing in a positive time inclination becomes the longest, and the change amount of the current value subtracting the current IL2 from the current IL1 is smaller as compared with the comparative example. Therefore, in the differential output DC-DC converter 1, as compared with the comparative example of controlling conduction of the first transistor FET1 and the third transistor FET3 without synchronizing, the peak value of the ripple voltage is suppressed, and generated noise is decreased, the current value of charging and discharging of the capacitor C2 is decreased, and the power loss for charging and discharging can be decreased.

Embodiment 2

Figure 3:
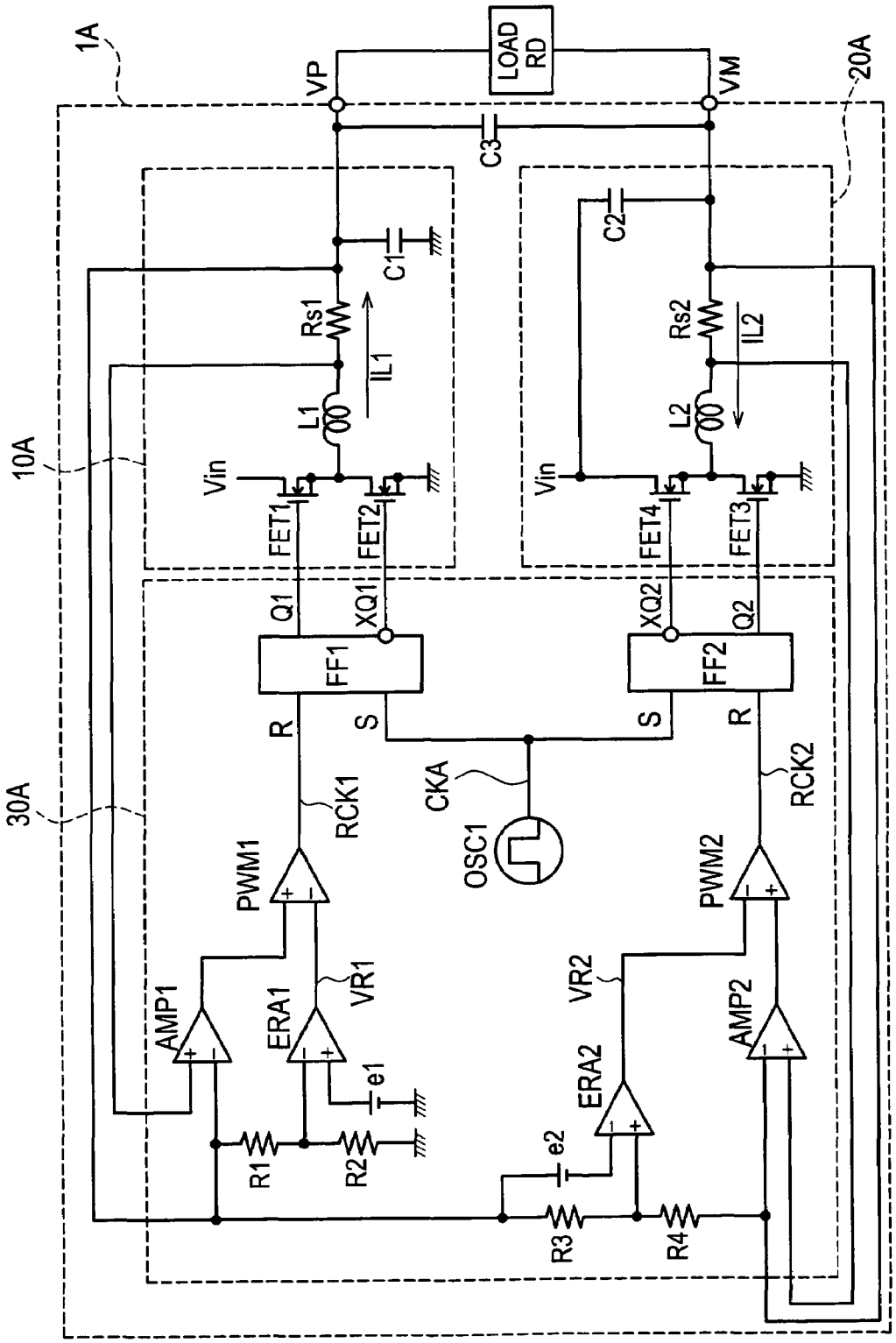
FIG. 3 is a circuit diagram of the differential output DC-DC converter in an embodiment 2 of the invention.

FIG. 3 is a circuit diagram of a differential output DC-DC converter 1A in an embodiment 2. The differential output DC-DC converter 1A operating in a current mode comprises a first switching regulator 10A of a current source type, a second switching regulator 20A of a current sink type, and a control unit 30A for controlling the first switching regulator 10A and the second switching regulator 20A.

The first switching regulator 10A is similar to a first switching regulator 10 of an embodiment 1, except that a sense resistance Rs1 is provided between a choke coil L1 and an output terminal VP. This sense resistance Rs1 converts a current IL1 flowing in the choke coil L1 into a voltage generated at both ends, and detects.

The second switching regulator 20A is similar to a second switching regulator 20 of an embodiment 1, except that a sense resistance Rs2 is provided between a choke coil L2 and an output terminal VM, and that a source electrode side of a fourth transistor FET4 forming a synchronous rectifying circuit is connected to a power supply terminal Vin. This sense resistance Rs2 converts a current IL2 flowing in the choke coil L2 into a voltage generated at both ends, and detects.

The control unit 30A is similar to a control unit 30 of the embodiment 1, except that an operational amplifier AMP1 for amplifying a voltage at both ends of the sense resistance Rs1 and an operational amplifier AMP2 for amplifying a voltage at both ends of the sense resistance Rs2 are provided. Further, instead of a sawtooth signal CKN issued by a sawtooth oscillator OSC2 in the embodiment 1, an operational amplifier PWM1 supplies an output of the operational amplifier AMP1 to a non-inversion input, and an operational amplifier PWM2 supplies an output of the operational amplifier AMP2 to a non-inversion input. That is, in the control unit 30A, current values of currents IL1 and IL2 are used, instead of the sawtooth signal CKN, in generation of a reset signal RCK1.

The differential output DC-DC converter 1A in the embodiment 2 also operates in timing in FIG. 2, except for a generating method of the reset signal RCK1 mentioned above and a reset signal RCK2. That is, in the differential output DC-DC converter 1A, too, at (6), the energy accumulated in the choke coil L2 is generated at the output terminal VP side. As a result, consumption of power is decreased as compared with the case of using a linear regulator or a switching regulator not performing regenerative operation at a sink side regulator.

Embodiment 3

Figure 4:
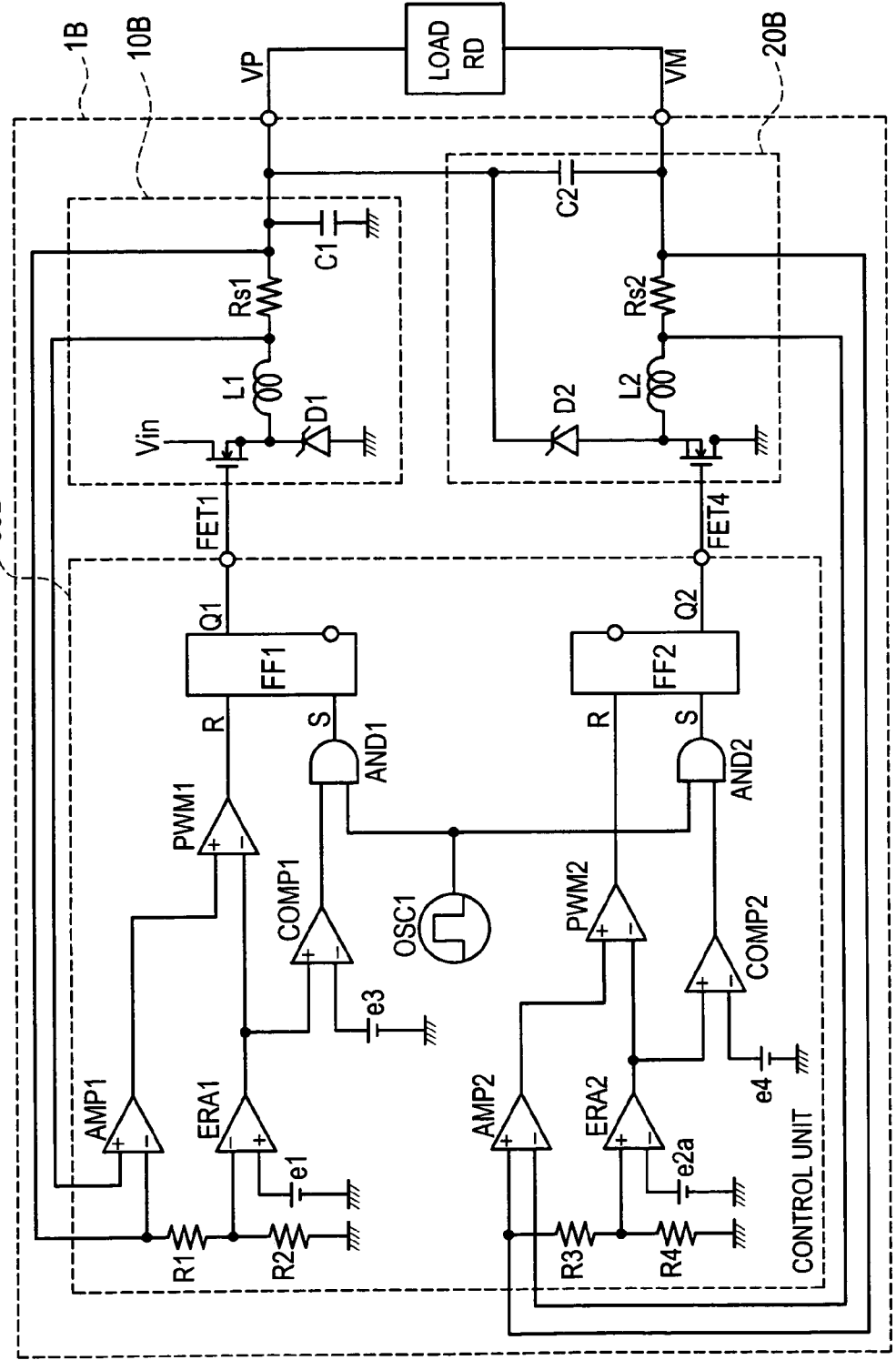
FIG. 4 is a circuit diagram of the differential output DC-DC converter in an embodiment 3 of the invention.
Figure 5:
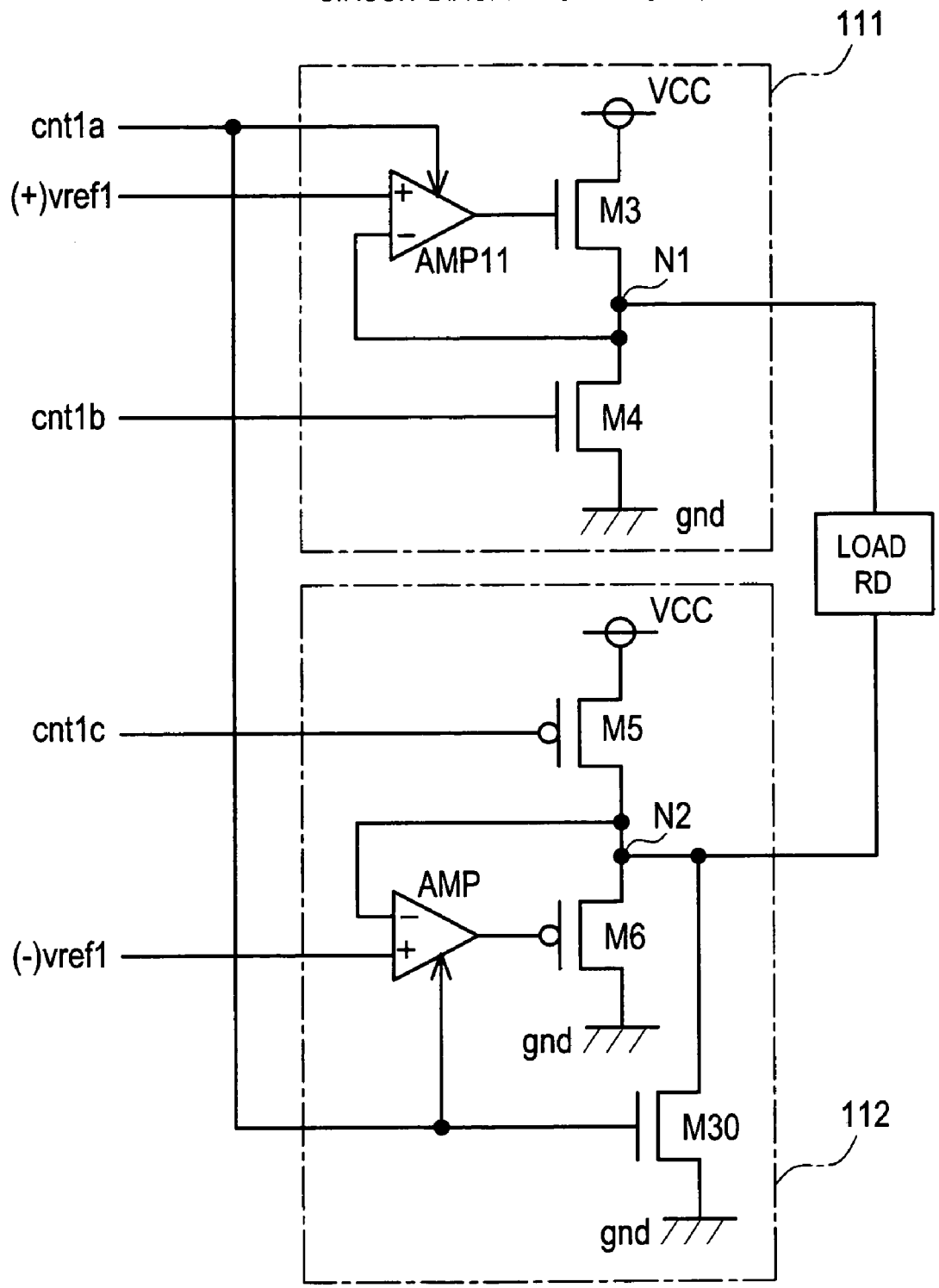
FIG. 5 is a circuit diagram of prior art.

FIG. 4 is a circuit diagram of a differential output DC-DC converter 1B in an embodiment 3. The differential output DC-DC converter 1B operating in a current mode comprises a first switching regulator 10B of a current source type, a second switching regulator 20B of a current sink type, and a control unit 30B for controlling the first switching regulator 10B and the second switching regulator 20B.

The first switching regulator 10B is similar to a first switching regulator 10 of an embodiment 1, except that a sense resistance Rs1 is provided between a choke coil L1 and an output terminal VM, and that a first diode D1 as an asynchronous rectifying circuit is provided instead of a second transistor FET2 as a synchronous rectifying circuit. This sense resistance Rs1 converts a current IL1 flowing in the choke coil L1 into a voltage generated at both ends, and detects.

The second switching regulator 20B is similar to a second switching regulator 20 of the embodiment 1, except that a sense resistance Rs2 is provided between a choke coil L2 and the output terminal VM, and that a second diode D2 as the asynchronous rectifying circuit is provided instead of a fourth transistor FET4 as the synchronous rectifying circuit. This sense resistance Rs2 converts a current IL2 flowing in a choke coil L2 into a voltage generated at both ends, and detects.

The control unit 30B is similar to a control unit 30A of an embodiment 2, except that a section relating to current control is different. That is, it includes operational amplifiers COMP1, COMP2, AND gates AND1, AND2, and base voltages e3 and e4 for executing a known cycle skip operation in a first diode D1 and a second diode D2 forming the asynchronous rectifying circuit.

In the operational amplifier COMP1 included in the portion for controlling the first switching regulator 10B, a reference voltage VR1 is supplied to a non-inversion terminal and the base voltage e3 is supplied to an inversion input. In the AND gate AND1, the output of the operational amplifier COMP1 is supplied to one input, and a clock signal CK is supplied to the other input. Accordingly, only when the reference voltage VR1 exceeds the base voltage e3, a set signal SCK1 is changed to the high level depending on the clock signal CK. That is, if the voltage of the middle voltage VM1 varying depending on the output terminal VP exceeds the base voltage e1, by setting the base voltage e3 appropriately, transition of the set signal SCK1 to the high level can be limited, that is, the cycle skip operation can be realized.

As for the operational amplifier COMP2, the AND gate AND2, and the base voltage e4 included in the portion for controlling the second switching regulator 20B, the operation is the same as in the operational amplifier COMP1, the AND gate AND1, and the base voltage e3 in the first switching regulator 10B, and explanation is omitted.

In the control unit 30B, in the error amplifier ERA2, the middle voltage VM2 is supplied to the non-inversion input, and the base voltage e2a from grounding point GND is supplied, instead of base voltage e2, in inversion input (herein, the base voltage e2=the voltage of the output terminal VP in the ordinary state=the base voltage e2). Accordingly, when the synchronous rectifying circuit such as the fourth transistor FET4 is used in the rectifying circuit, as mentioned above, right after supply of power source, time delay is caused until the operation of the second switching regulator 20B is stabilized.

Therefore, in the second switching regulator 20B of the embodiment 3, the second diode D2 as the asynchronous rectifying circuit is used in the rectifying circuit. Accordingly, in the pathway from the output terminal VP to the output terminal VM by way of the choke coil L2, flow of the reverse current of the current IL2 is prevented. Therefore, the current IL2 prevents accumulation of energy in the reverse direction of the ordinary state, and time delay until the operation of the second switching regulator 20B is stabilized can be suppressed.

The invention is not limited to these embodiments alone, and may be changed and modified within the scope not departing from the true spirit of the invention.

For example, the structure of connecting the source electrode of the fourth transistor FET4 to the power supply terminal Vin in the embodiment 2 may be also applied to the embodiment 1 and the embodiment 3.

The differential output DC-DC comparator 1 is an example of the DC-DC comparator, the first switching regulator 10 is an example of the first regulator, and the second switching regulator 20 is an example of the second regulator and the switching regulator. The first transistor FET1 is an example of the main switch of the first regulator, the second transistor FET2 is an example of the rectifying circuit of the first regulator, the third transistor FET3 is an example of the main switch of the second regulator, and the fourth transistor FET4 is an example of the rectifying circuit of the second regulator. The choke coil L1 is an example of the main inductor of the first regulator, the choke coil L2 is an example of the main inductor of the second regulator, the output terminal VP is an example of the first terminal of the first regulator and the high voltage side terminal of the load in the switching regulator, and the output terminal VM is an example of the second terminal of the second regulator and the low voltage side terminal of the load in the switching regulator. The pulse oscillator OSC1 is an example of the clock signal generator, the clock signal CK is an example of the synchronous signal, the flip-flop FF1 is an example of the first synchronous signal and a first latch circuit, the flip-flop FF2 is an example of the second synchronous signal and a second latch circuit, and the error amplifier ERA2 is an example of the error amplifier. The first diode D1 is an example of the rectifying circuit of the first regulator, the second diode D2 is an example of the rectifying circuit of the second regulator, resistance elements R3 and R4 are examples of a voltage dividing circuit, and the base voltage e2 is an example of the base voltage of the second regulator.

By applying the invention, the DC-DC converter and the switching regulator capable of saving power consumption can be presented.

What is claimed is:

1. A DC-DC converter comprising:
   a first terminal electrically connected to one end of a load;
   a second terminal electrically connected to another end of the load;
   a first regulator for passing a current in a direction from the first terminal toward the load, and issuing a first voltage to the first terminal; and
   a second regulator for passing a current in a direction from the load toward the second terminal, and issuing a second voltage, being higher than a grounding voltage and lower than the first voltage, to the second terminal;
   wherein the second regulator is a switching regulator, including a main inductor and a main switch provided sequentially in a pathway from the second terminal to the grounding voltage, and a rectifying circuit provided in a direction of passing the current from an electrical connection point of the main inductor and the main switch, toward the first terminal or a power supply terminal.

2. The DC-DC converter of claim 1, wherein the first regulator and the second regulator are both a switching regulator of step-down type, including a synchronous signal generator for generating a synchronous signal, a first synchronous circuit for starting increase of current in a direction from the first terminal toward the load depending on the synchronous signal, and a second synchronous circuit for starting increase of current in a direction from the load toward the second terminal depending on the synchronous signal.

3. The DC-DC converter of claim 2, wherein the first synchronous circuit makes the main switch of the first regulator conductive, depending on the synchronous signal, and the second synchronous circuit makes the main switch of the second regulator conductive, depending on the synchronous signal.

4. The DC-DC converter of claim 3, wherein the first synchronous circuit is a first latch circuit that has an output terminal and a set terminal, the output terminal of the first latch circuit being connected to a conduction control terminal of the main switch in the first regulator and the set terminal of the first latch circuit being inputted by the synchronous signal, and the second synchronous circuit is a second latch circuit that has an output terminal and a set terminal, the output terminal of the second latch circuit being connected to a conduction control terminal of the main switch in the second regulator and the set terminal of the second latch circuit being inputted by the synchronous signal.

5. The DC-DC converter of claim 1, further comprising:
   a voltage dividing circuit provided between the first voltage and the second voltage, for issuing a voltage divided between the first voltage and the second voltage,
   a base voltage unit having a positive terminal connected to the first voltage, and
   an error amplifier having an inversion input terminal connected to a negative terminal of the base voltage unit, and a non-inversion terminal connected to an output terminal of the voltage dividing circuit.

6. A switching regulator comprising:
   a main inductor and a main switch provided sequentially in a pathway from a low voltage side terminal of a load to a grounding voltage, and
   a rectifying circuit provided in a direction of a passing current from a connection point of the main inductor and the main switch toward a high voltage side terminal of the load, wherein the current is passed from the load to a lead-in direction, and an output voltage higher than the grounding voltage and lower than a voltage supplied to the load is issued to the low voltage side terminal of the load.

7. The switching regulator of claim 6, further comprising:
   a voltage dividing circuit provided between the high voltage side terminal of the load and the low voltage side terminal of the load, for issuing a voltage divided between the voltage supplied to the high voltage side terminal of the load and the output voltage,
   a base voltage unit having a positive terminal connected to the high voltage side terminal of the load, and
   an error amplifier having an inversion input terminal connected to a negative terminal of the base voltage unit, and a non-inversion input terminal connected to an output terminal of the voltage dividing circuit.

8. A control method of a DC-DC converter including a first terminal electrically connected to one end of a load, a second terminal electrically connected to another end of the load, a first regulator of a switching regulator of step-down type for passing a current in a direction from the first terminal toward the load, and issuing a first voltage to the first terminal, and a second regulator of the switching regulator of step-down type for passing a current in a direction from the load toward the second terminal, and issuing a second voltage, being higher than a grounding voltage and lower than the first voltage, to the second terminal, comprising:
   a step of generating a synchronous signal,
   a step of starting increase of a current in a direction from the first terminal to the load depending on the synchronous signal, and
   a step of starting increase of a current in a direction from the load to the second terminal depending on the synchronous signal.

9. The control method of a DC-DC converter of claim 8, wherein the step of starting increase of a current in a direction from the first terminal to the load is a step of conducting a main switch of the first regulator, and the step of starting increase of a current in a direction from the load to the second terminal is a step of conducting a main switch of the second regulator.

10. A control method of a DC-DC converter including a first terminal electrically connected to one end of a load, a second terminal electrically connected to another end of the load, first regulator for passing a current in a direction from the first terminal toward the load, and issuing a first voltage to the first terminal, and a second regulator of a switching regulator of step-down type for passing a current in a direction from the load toward the second terminal, and issuing a second voltage, being higher than a grounding voltage and lower than the first voltage, to the second terminal, comprising:
   a step of issuing a divided voltage divided between the first voltage and the second voltage,
   a step of generating a threshold voltage by subtracting a specified voltage from the first voltage, and
   a step of generating an error signal by subtracting the threshold voltage from the divided voltage and amplifying the error signal.

11. A control method of a switching regulator for passing a current from a load to a lead-in direction, and issuing an output voltage higher than a voltage and lower than a voltage supplied to the load, to a low voltage side terminal of the load, comprising:

a step of issuing a divided voltage divided between the voltage supplied to a high voltage side terminal of the load and the output voltage, a step of generating a threshold voltage by subtracting a specified voltage from the voltage supplied to the high voltage side terminal of the load, and a step of generating an error signal by subtracting the threshold voltage from the divided voltage and amplifying the error signal.

* * * * *